US010264649B2

(12) United States Patent
Lu et al.

(10) Patent No.: US 10,264,649 B2
(45) Date of Patent: Apr. 16, 2019

(54) CONTROL SET FOR ADJUSTING LIGHT SOURCE

(71) Applicant: Xiamen PVTECH Co., Ltd., Xiamen, Fujian (CN)

(72) Inventors: Fuxing Lu, Fujian (CN); Rongtu Liu, Nanan (CN)

(73) Assignee: Xiamen PVTECH Co., Ltd., Xiamen, Fujian (CN)

( * ) Notice: Subject to any disclaimer, the term of this patent is extended or adjusted under 35 U.S.C. 154(b) by 0 days.

(21) Appl. No.: 15/721,958

(22) Filed: Oct. 1, 2017

(65) Prior Publication Data

US 2018/0352631 A1 Dec. 6, 2018

(30) Foreign Application Priority Data

Jun. 5, 2017 (CN) .......................... 2017 1 0414312

(51) Int. Cl.
| | |
|---|---|
| *F21K 9/65* | (2016.01) |
| *H05B 37/02* | (2006.01) |
| *H05B 41/38* | (2006.01) |
| *H05B 33/08* | (2006.01) |

(52) U.S. Cl.
CPC .............. *H05B 37/02* (2013.01); *F21K 9/65* (2016.08); *H05B 33/0803* (2013.01); *H05B 41/38* (2013.01); *Y02B 20/42* (2013.01)

(58) Field of Classification Search
CPC .... H05B 37/02; H05B 41/38; H05B 33/0803; F21K 9/65
See application file for complete search history.

(56) References Cited

U.S. PATENT DOCUMENTS

2003/0020677 A1* 1/2003 Nakano ................. G09G 3/3413
345/87
2005/0104805 A1* 5/2005 Masaki .................... G04G 5/04
345/46

OTHER PUBLICATIONS

LUTRON Maestro Occupancy/Vacancy Sensor C L Dimmer Additional Programming, Installation, and Troubleshooting Help (manual published Feb. 2015).*

* cited by examiner

*Primary Examiner* — Evan P Dzierzynski
(74) *Attorney, Agent, or Firm* — Winston Hsu

(57) ABSTRACT

A control set for adjusting the light source is provided. The control set includes a control module. The control module includes a control chip and a storage. The control chip controls the brightness of the lamp. The storage connected with a timing unit and stores a fine tuning signal. The fine tuning signal stored in the storage is generated and output to the adjust signal by turning off and turning on the adjustable power switch, the timing unit sets a preset time period in which the fine tuning signal maintains effective, and the fine tuning signal controls the lamp to have a brightness the same as the brightness when the lamp is turned off last time, or the brightness of the lamp is gradually increased to the preset brightness and then decreased.

8 Claims, 4 Drawing Sheets

US 10,264,649 B2

CONTROL SET FOR ADJUSTING LIGHT SOURCE

CROSS REFERENCE TO RELATED APPLICATION

This application claims the benefit of China Patent Application No. 201710414312.0, filed Jun. 5, 2017, and included herein by reference.

BACKGROUND OF THE INVENTION

1. Field of the Invention

The invention relates to a control set and, more particularly, to a control set for adjusting a light source.

2. Description of the Prior Art

Nowadays, lamps are necessary in daily life. Since tubes and LED lamps have low power consumption and are applicable in different using environments, they are wildly used.

Conventionally, in an indoor control module, the switch for fine tuning light usually has a rotate type. However, the brightness of the light cannot be fixed via the rotate type switch, and the brightness of the light should be readjusted next time. Another common type switch only has on and off modes, and it cannot be used for fine tuning light.

SUMMARY OF THE INVENTION

A control set for adjusting the light source is provided. A control set for adjusting a light source of a lamp, the control set includes a control module electronically connected with the lamp and an adjustable power switch, the adjustable power switch outputs an adjust signal to gradually increase or decrease the brightness of the lamp, the control module comprising: a control chip connected with the lamp and the adjustable power switch, the control chip is configured to control that the brightness of the lamp is gradually increased to a preset brightness and then decreased; and a storage connected with a timing unit, the fine tuning signal stored in the storage is generated and output to the adjust signal by turning off and turning on the adjustable power switch, the timing unit sets a preset time period in which the fine tuning signal maintains effective, and the fine tuning signal controls the lamp to have a brightness the same as the brightness when the lamp is turned off last time, or the brightness of the lamp is gradually increased to the preset brightness and then decreased.

In sum, in embodiments, in the process that the brightness of the lamp gradually becomes bright or dark, by turning on and turning off the adjustable power switch, the confirmed fine tuning signal (corresponding to the final brightness when the lamp is turned off) is stored in the storage. Then, when the lamp is turned on via the adjustable power switch next time, the lamp has the final brightness last time. The storage is connected to the timing unit. The timing unit sets a preset time period in which the fine tuning signal is effective. If the lamp is turned on beyond the preset time period, the lamp has the preset setting brightness. That is, the fine tuning signal stored in the storage is generated and output to the adjust signal by turning off and turning on the adjustable power switch. The timing unit sets the preset time period in which the fine tuning signal maintains effective. When the lamp is turned on next time, the fine tuning signal controls the lamp to have brightness as the final brightness last time, or the brightness of the lamp is gradually increased to the preset brightness and then decreased.

The control set in embodiments is applicable to any type of lamps, but not need to cooperate with a control module of a specific type.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

These and other features, aspects and advantages of the invention will become better understood with regard to the following embodiments and accompanying drawings.

DETAILED DESCRIPTION

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion. The terms "and/or" includes one or more related components, steps and so on.

Unless otherwise defined, all terms (including technical and scientific terms) have the same meaning as commonly understood for people skilled in the art. Unless explicitly defined, terms commonly used in dictionaries have meanings consistent with the content of the related art, but not have an excessive idealized or overly formal sense understanding.

Embodiments are illustrated with figures but not used to limit the scope of the invention. The invention will be better understood with the embodiments hereinafter.

Figure 1:
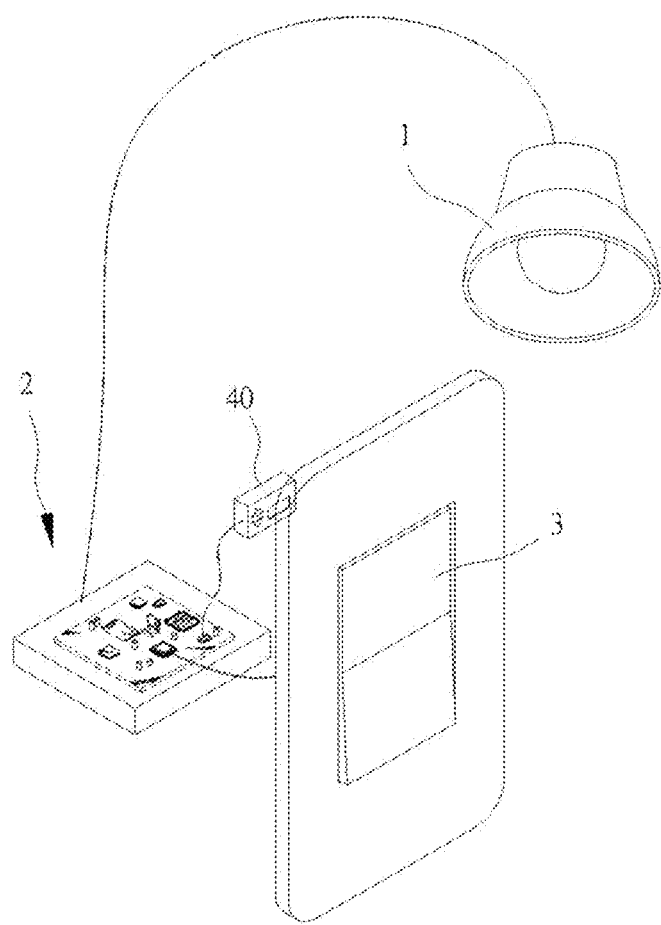
FIG. 1 is a schematic diagram showing a control set for adjusting a light source in an embodiment.
Figure 2:
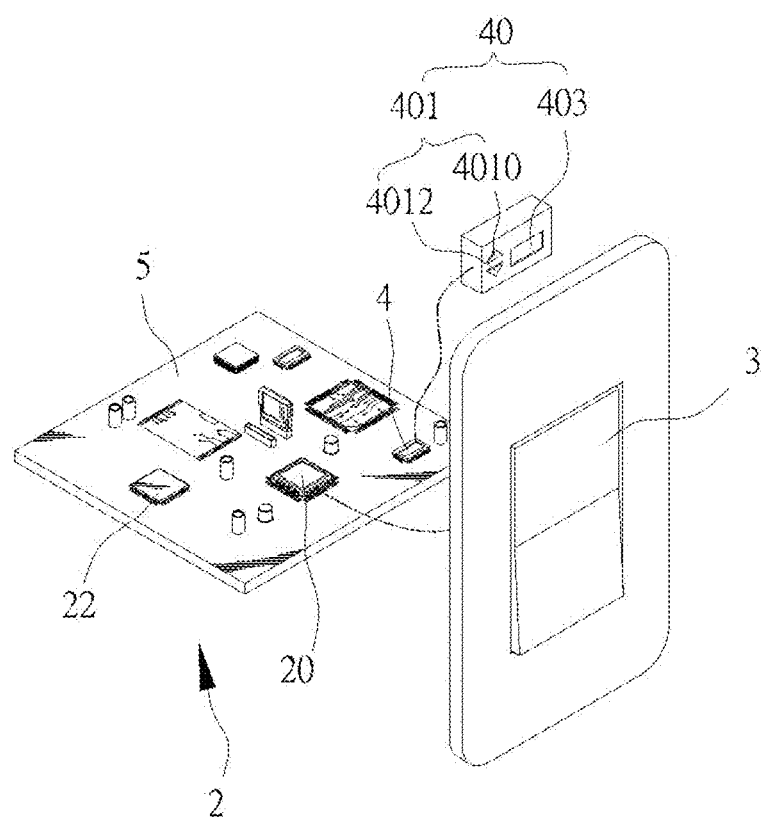
FIG. 2 is a schematic diagram showing the structure of a control set for adjusting a light source in an embodiment.

FIG. 1 is a schematic diagram showing a control set for adjusting a light source in an embodiment. FIG. 2 is a schematic diagram showing the structure of a control set for adjusting a light source in an embodiment. In the embodiment, a control set for adjusting a light source includes a lamp 1, a control module 2, and an adjustable power switch 3. The control module 2 is electronically connected with the lamp 1 and the adjustable power switch 3. The control module 2 includes a control chip 20 and a storage 22. The control chip 20 is connected with the adjustable power switch 3 and the lamp 1. The control chip 20 outputs an adjust signal (for example, the brightness divides into 0-100 levels) to the lamp 1. The adjustable power switch 3 outputs a fine tuning signal stored in the storage 22 to the adjust signal in an on/off mode.

In other words, when the adjustable power switch 3 is turned on, the control chip 20 generates an adjust signal to the lamp 1. Then, the lamp 1 is gradually lightened from the brightness of the level 0 to the level 100. When the lightness becomes to the level 100 and the adjustable power switch 3 is not turned off, the brightness of the lamp 1 is changed from the maximum brightness (level 100) to the minimum brightness (level 0) until the adjustable power switch 3 is turned off. When the adjustable power switch 3 is pressed, the fine tuning signal is output to confirm the brightness. The fine tuning signal is stored in the storage 22. Consequently, when the adjustable power switch 3 is turned on next time, the brightness of the lamp 1 when turned on maintains at the brightness when the lamp 1 is turned off last time. The terms "next time" and "last time" are two adjacent times.

In an embodiment, the storage 22 further includes a timing unit 4. The timing unit 4 is configured to set a preset time period (such as five minutes). If the adjustable power switch 3 is turned on within five minutes after the adjustable power switch 3 is turned off last time, the brightness of the lamp 1 maintains at the brightness when the lamp 1 is turned off last time. Otherwise, if the adjustable power switch 3 is turned on beyond five minutes after the adjustable power switch 3 is turned off last time, the lamp 1 has a preset setting brightness when the light 1 is turned on next time.

In an embodiment, the control chip 20, the storage 22, and the timing unit 4 are integrated to a circuit board 5 and electronically connected with the lamp 1. Then, an integrated device is formed. In an embodiment, the timing unit 4 is connected to a time adjust device 40. The time adjust device 40 includes an input device 401 and a display screen 403. The input device 401 includes an up button 4010 and a down button 4012. The up button 4010 and the down button 4012 are used to adjust the time period. The time period is displayed at the display screen 403. By adjusting the preset time period via the time adjust device 40, the time period in which the lamp 1 maintains the brightness when the lamp 1 is turned on is changed according to requirements. Then, the time period for maintaining the effective of the fine tuning light is changed according to requirements.

Figure 3:
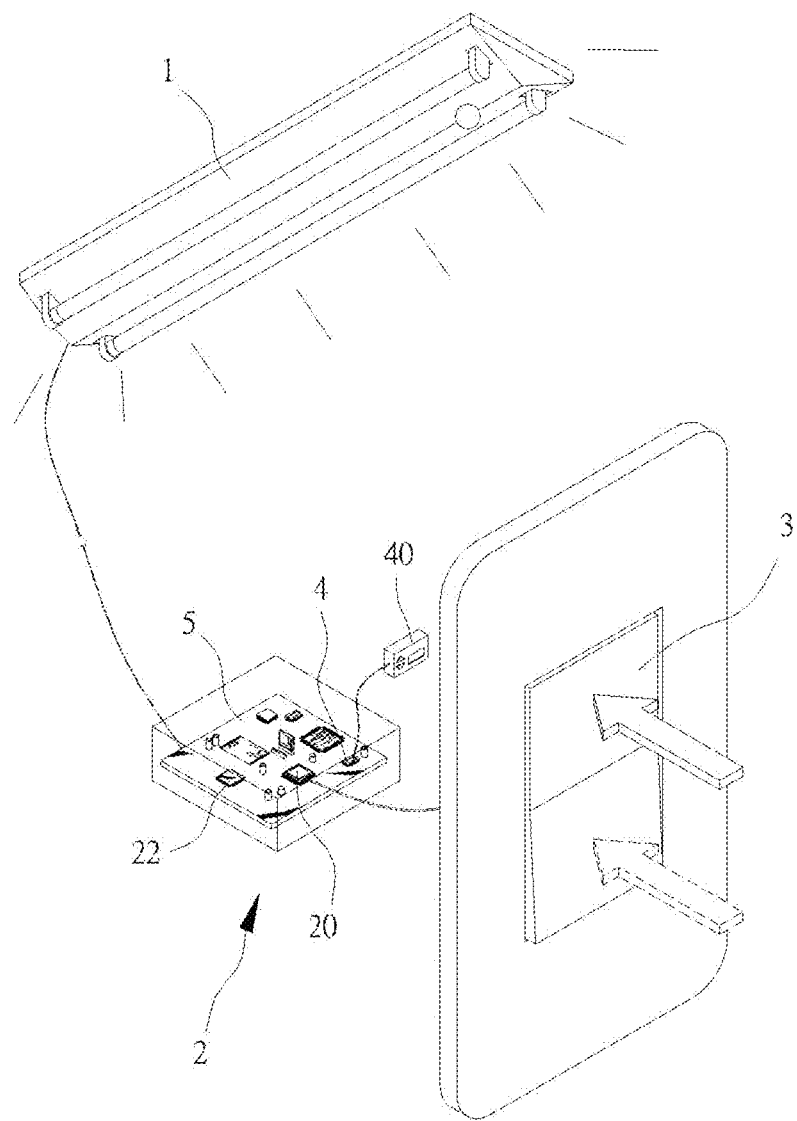
FIG. 3 is a schematic diagram showing a control set for adjusting a light source in a first use state in an embodiment.
Figure 4:
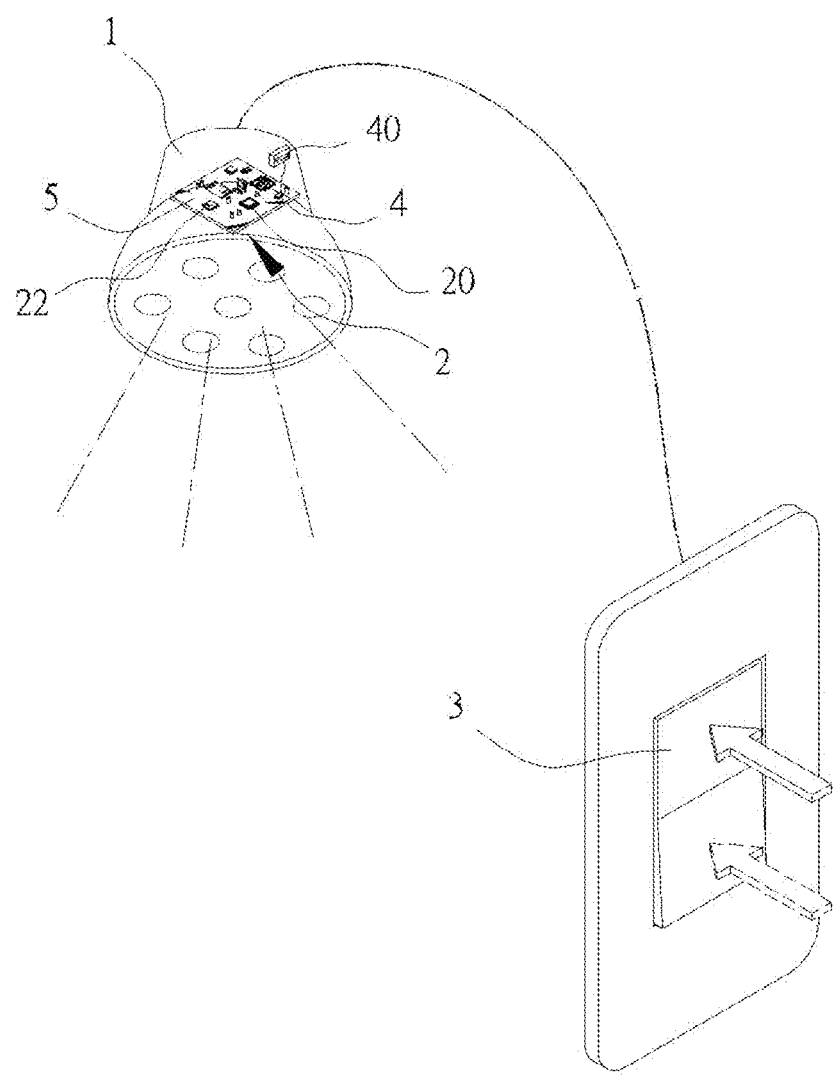
FIG. 4 is a schematic diagram showing a control set for adjusting a light source in a second use state in an embodiment.

FIG. 3 and FIG. 4 are schematic diagrams showing a control set for adjusting a light source in a first use state and a second use state in embodiments. In FIG. 3, the adjust signal is used to adjust to the brightness of level 20 (a little dark) as an example. The lamp includes a T4 type tube. The control module 2 is externally configured and connected to the lamp 1 via electric wires. To adjust the lamp 1, the adjustable power switch 3 is turned on (the press direction is shown as the direction of a solid arrow in figures). At the time, the control chip 20 outputs an adjust signal to the lamp 1 (the brightness includes level 0 to level 100). If the adjustable power switch 3 is turned off (the press direction is shown as a direction of a dotted arrow in figures) when the adjust signal is at the brightness of level 20, a fine tuning signal corresponding to the brightness of level 20 is stored in the storage 22.

If the adjustable power switch 3 is turned on next time within the preset time period (such as five minutes), the brightness of the lamp 1 maintains at the brightness corresponding to the fine tuning signal stored in the storage 22 (that is, the brightness when the lamp is turned off last time). In the embodiment, the brightness corresponding to the fine tuning signal stored in the storage 22 is the brightness of level 20 (not shown), which is a little dark and the light is shown as short lines. If the lamp 1 is turned on after the time period longer than the preset time period, the lamp 1 when turned on has a brightness of an original setting value but not the brightness corresponding to the fine tuning signal last time.

The control chip 20, the storage 22, and the timing unit 4 are integrated to the circuit board 5 to form an integrated device. The control chip 20, the storage 22, and the timing unit 4 are electronically connected with the lamp 1. The timing unit 4 is connected to the time adjust device 40. The up button 4010 and the down button 4012 are used to adjust the preset time period. The preset time period is displayed at the display screen 403. The preset time period is adjusted to allow the lamp to maintain at the brightness when turned on within the preset time period. The time period is between the time that the adjustable power switch 3 is turned on next time and the time that the adjustable power switch 3 is turned off last time.

In FIG. 4, the adjust signal is used to adjust to the brightness of level 80 (quite bright) as an example. The lamp 1 is a LED lamp. The control module 2 is configured in the lamp 1. To adjust the lamp 1, the adjustable power switch 3 is turned on (the press direction is shown as the direction of a solid arrow in figures). At the time, the control chip 20 outputs an adjust signal to the lamp 1 (the brightness includes level 0 to level 100). If the adjustable power switch 3 is turned off (the press direction is shown as a direction of a dotted arrow in figures) when the adjust signal is at the brightness of level 80, a corresponding fine tuning signal is stored in the storage 22.

If the adjustable power switch 3 is turned on next time within the preset time period (such as twenty minutes) set by the timing unit 4, the brightness of the lamp 1 maintains at the brightness corresponding to the fine tuning signal (that is, the brightness when the lamp is turned off last time). In the embodiment, the brightness corresponding to the fine tuning signal stored in the storage 22 is the brightness of level 80 (not shown), which is quite bright and the light is shown as long lines. If the lamp 1 is turned on after a time period longer than the preset time period, the brightness of the lamp 1 has a brightness of an original setting value but not the brightness corresponding to the fine tuning signal last time.

In sum, in embodiments, in the process that the brightness of the lamp gradually becomes bright or dark, by turning on and turning off the adjustable power switch, the confirmed fine tuning signal (corresponding to the final brightness when the lamp is turned off) is stored in the storage. Then, when the lamp is turned on via the adjustable power switch next time, the lamp has the final brightness last time. The storage is connected to the timing unit. The timing unit sets a preset time period in which the fine tuning signal is effective. If the lamp is turned on beyond the preset time period, the lamp has the preset setting brightness. That is, the fine tuning signal stored in the storage is generated and output to the adjust signal by turning off and turning on the adjustable power switch. The timing unit sets the preset time period in which the fine tuning signal maintains effective. When the lamp is turned on next time, the fine tuning signal controls the lamp to have brightness as the final brightness last time, or the brightness of the lamp is gradually increased to the preset brightness and then decreased. The control set in embodiments is applicable to any type of lamps, but not need to cooperate with a control module of a specific type.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control set for adjusting a light source of a lamp, the control set includes a control module electronically connected with the lamp and an adjustable power switch, the adjustable power switch outputs an adjust signal to gradually increase or decrease the brightness of the lamp, the control module comprising:
a control chip connected with the lamp and the adjustable power switch, the control chip is configured to control that the brightness of the lamp is gradually increased to a preset brightness and then decreased; and
a storage connected with a timing unit, a fine tuning signal stored in the storage is generated and output to the adjust signal by turning off and turning on the adjustable power switch, the timing unit sets a preset time period in which the fine tuning signal maintains effective, and the fine tuning signal controls the lamp to have a brightness the same as the brightness when the lamp is turned off last time, or the brightness of the lamp is gradually increased to the preset brightness and then decreased.

2. The control set for adjusting the light source according to claim 1, wherein the control set further comprises a circuit board for the control chip, the storage, and the timing unit integrated to, and the circuit board is electronically connected with the control module.

3. The control set for adjusting the light source according to claim 1, further comprising a time adjust device connected with the timing unit and configured to adjust the preset time period.

4. The control set for adjusting the light source according to claim 3, wherein the time adjust device further includes an input device and a display screen.

5. The control set for adjusting the light source according to claim 4, wherein the input device includes an up button and a down button.

6. The control set for adjusting the light source according to claim 1, wherein the lamp includes a LED tube or a T4 type tube.

7. The control set for adjusting the light source according to claim 1, wherein the control module is configured in the lamp.

8. The control set for adjusting the light source according to claim 1, wherein the control module is external to the lamp.

* * * * *